US005675219A

United States Patent [19]
Helfrich

[11] Patent Number: 5,675,219
[45] Date of Patent: Oct. 7, 1997

[54] DEGAUSSING CIRCUIT FOR WIDE-RANGE AC

[75] Inventor: Kenneth Jay Helfrich, Fishers, Ind.

[73] Assignee: Thomson Consumer Electronics, Inc., Indianapolis, Ind.

[21] Appl. No.: 577,527

[22] Filed: Dec. 21, 1995

[51] Int. Cl.$^6$ ............... H01F 13/00; H04N 9/29
[52] U.S. Cl. ................. 315/8; 315/1; 361/150
[58] Field of Search ............ 315/8, 1; 361/149, 361/150

[56] References Cited

U.S. PATENT DOCUMENTS 3,617,800  11/1971  Ishikawa ........................ 315/8
3,619,703  11/1971  Yamashita et al. .............. 315/8
4,742,270  5/1988   Fernsler et al. ................ 315/8
5,241,448  8/1993   Stolte .......................... 361/150

Primary Examiner—Robert Pascal
Assistant Examiner—David Vu
Attorney, Agent, or Firm—Joseph S. Tripoli; Joseph J. Laks; Marion P. Metelski

[57] ABSTRACT

An automatic degaussing circuit provides a video display apparatus with a degaussing capability over a wide range of ac mains sources. An ac mains source is coupled to a degaussing coil by a series interconnection of first and second temperature-sensitive resistances. The temperature-sensitive resistances have oppositely-tending temperature coefficients, so that a total dc impedance of the automatic degaussing circuit initially decreases after power is applied to the circuit.

10 Claims, 4 Drawing Sheets

120 V_RMS
5A/DIV
50ms/DIV

120 V_RMS
5A/DIV
50ms/DIV

120 V_RMS
5A/DIV
50ms/DIV

120 V$_{RMS}$
200mA/DIV
50ms/DIV

SINGLE-PTC

RELAY DE-ENERGIZED

DUAL-PTC

120 V$_{RMS}$
200mA/DIV
50ms/DIV

RELAY DE-ENERGIZED

DEGAUSSING CIRCUIT 10

120 V$_{RMS}$
200mA/DIV
50ms/DIV

RELAY DE-ENERGIZED

240 V<sub>RMS</sub>
5A/DIV
50ms/DIV

240 V<sub>RMS</sub>
5A/DIV
50ms/DIV

240 V<sub>RMS</sub>
5A/DIV
50ms/DIV

DEGAUSSING CIRCUIT FOR WIDE-RANGE AC

BACKGROUND OF THE INVENTION

1. Field of the Invention

This invention relates generally to the field of degaussing circuits for video display apparatus, and, in particular, to degaussing circuits that terminate a degaussing current after a predetermined period of time.

2. Description of Prior Art

A color cathode ray tube (CRT) requires periodic degaussing, or demagnetization, in order to offset the effects that ambient magnetic fields may have on the CRT's metallic components. By way of an example, the CRT's shadow mask can become magnetized by the earth's magnetic field or by an electromagnetic field generated by the operation of a neighboring motor, appliance, or other such electrical apparatus. The shadow mask, thus permanently magnetized, produces localized magnetic fields, which can affect the paths of the CRT's electron beams and, hence, the location at which the electron beams impinge upon the CRT's phosphor screen. A deviation in the paths of the CRT's electron beams can result in a lateral shift of a video image displayed by the CRT. In addition, the color purity of the video image displayed by the CRT can be noticeably deteriorated.

Color television receivers, computer monitors and other video display apparatus typically include an automatic degaussing circuit in order to compensate for the presence of ambient magnetic fields. Such a degaussing circuit enables the CRT to be degaussed each time that power is applied to the video display apparatus.

A typical automatic degaussing circuit produces an alternating magnetic field which decays toward zero. One implementation of such a circuit may comprise a temperature-sensitive device, for example a positive-temperature-coefficient (PTC) thermistor, connected in series between a dedicated degaussing relay and a degaussing coil. The degaussing relay is energized when power is applied to the video display apparatus, and it is de-energized at a predetermined time, for example between 1 and 2 seconds, after the relay initially has been energized.

Initially, when the degaussing relay is de-energized, no current flows in the degaussing circuit, so that the PTC thermistor is thermally cold and, consequently, has a low resistance. When power is applied to the video display apparatus, the degaussing relay is energized and power from a mains source, for example 120 $V_{RMS}$ at 60 Hz, is applied to the PTC thermistor. Because the resistance of the PTC thermistor is initially low, a large degaussing current begins to flow in the degaussing circuit. The PTC thermistor self-heats and its resistance thus increases. As a result, successive peaks of the alternating degaussing current are monotonically decreasing in magnitude. In this way the automatic degaussing circuit produces a decaying alternating current, shown in FIGS. 2(a) and 3(a), and thus a decaying alternating magnetic field, which degausses all metallic components that are within the CRT and that are adjacent to the CRT within the video display apparatus.

The single-PTC thermistor degaussing circuit works well at low mains voltages such as 120 $V_{RMS}$, but it is not effective at high mains voltages, for example 240 $V_{RMS}$. At such a high mains voltage, the degaussing current may decay too quickly if the PTC thermistor has a desirably low nominal resistance combined with a small thermal mass. For example, CRT manufacturers typically specify that, after five cycles of degaussing current, a peak-to-peak value of degaussing current should not decay below 50% of the initial peak-to-peak degaussing current. If, after five cycles of degaussing current, the peak-to-peak value of the degaussing current decays to below 50% of its initial peak-to-peak value, as illustrated in FIG. 4(a), a significant residual magnetization may develop in the metallic components within and adjacent to the CRT, for example in the CRT's shadow mask. The term "residual" is utilized herein to reference a quantity to a time when the degaussing relay changes from an energized, or closed, state to a de-energized, or open, state.

The single-PTC thermistor degaussing circuit can be modified for use with a higher voltage mains source, such as 240 $V_{RMS}$ at 60 Hz. Specifically, for the same degaussing coil, the single PTC thermistor can be replaced by a parallel combination of two PTC thermistors which has an equivalent nominal value equal to twice the nominal value of the single PTC thermistor. Such a dual-PTC thermistor degaussing circuit operates in a manner similar to the single-PTC thermistor degaussing circuit to produce the degaussing current shown in FIG. 4(b). The two PTC thermistors are thermally coupled so that they self-heat concurrently as the degaussing current flows through the degaussing circuit.

The dual-PTC thermistor degaussing circuit works well at high mains voltages such as 240 $V_{RMS}$, but, unfortunately, the dual-PTC thermistor degaussing circuit is not effective at low mains voltages, such as 120 $V_{RMS}$. At such a low mains voltage, the higher nominal resistance provided by the parallel combination of PTC thermistors reduces the flow of degaussing current and, hence, the self-heating of the two thermistors. The effective resistance of the two PTC thermistors does not, therefore, become as high as it would become with a higher mains voltage of, for example, 240 $V_{RMS}$. This may result in too large of a residual degaussing current, as illustrated in FIG. 3(b), and hence a significant residual magnetization in the metallic components within and adjacent to the CRT, at the time when the degaussing relay is de-energized.

The intensity of this residual magnetization is proportional to the product of the degaussing current flowing through the degaussing circuit at the instant that the degaussing relay is de-energized and the number of turns in the degaussing coil. CRT manufacturers typically assign each of their CRTs a specification limit, expressed in units of Ampere-turns, which should not be exceeded when the relay is de-energized to ensure that a significant residual magnetization is not induced in the metallic components within and adjacent to the CRT. The exact point on the degaussing current waveform at which the degaussing relay will be de-energized is unknown, so it is desirable to minimize the peak-to-peak amplitude of the degaussing current just prior to the time when the relay becomes de-energized.

A significant residual magnetization, whether caused by the degaussing current decaying too quickly or by too large of a residual degaussing current, is undesirable because it can induce the same problems that the degaussing circuit is designed to prevent. In the case of the CRT's shadow mask, a significant residual magnetization can cause a lateral shift in the video image displayed by the CRT. Color purity deterioration can also result from a residual magnetization on the CRT's shadow mask.

It would be useful to have a single degaussing circuit that could be used over a wide range of mains sources without generating a significant residual magnetization. Neither one of the two previously described degaussing circuits can be used over a wide range of mains sources without generating a significant residual magnetization. The single-PTC thermistor degaussing circuit may generate a significant residual magnetization at high mains voltages, for example 240 $V_{RMS}$, because its degaussing current may decay too quickly if the PTC thermistor has a desirably low nominal resistance combined with a small thermal mass. Moreover, the dual-PTC thermistor degaussing circuit may generate a significant residual magnetization at low mains voltages, for example 120 $V_{RMS}$, because the residual degaussing current flowing in the circuit at the time when the degaussing relay is de-energized may be too large.

SUMMARY OF THE INVENTION

A degaussing circuit according to an inventive arrangement taught herein provides an automatic degaussing circuit for a video display apparatus over a wide range of ac mains sources.

Such a degaussing circuit for a cathode ray tube comprises: a switch means coupled to a source of alternating voltage potential; first and second temperature-sensitive devices coupled in series with the switch means, one of the devices having a positive temperature coefficient and the other of the devices having a negative temperature coefficient; and, a degaussing coil having a first terminal coupled to one of the devices and a second terminal coupled to the source of alternating voltage potential.

A maximum peak-to-peak value of a degaussing current flowing through the degaussing coil may not occur during a first cycle of the degaussing current.

The switch means may comprise a relay, and the first and second temperature-sensitive devices may comprise resistances.

The above, and other features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
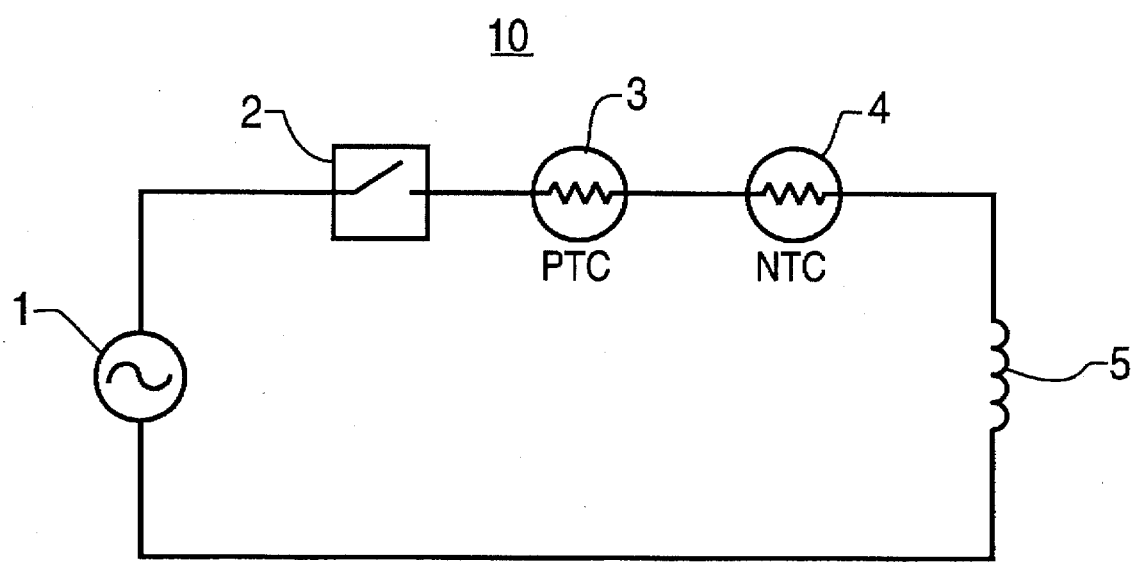
FIG. 1 is a schematic diagram of a degaussing circuit according to an inventive arrangement described herein.

An automatic degaussing circuit 10, shown in FIG. 1, may be used to demagnetize metallic components within and adjacent to a cathode ray tube within a video display apparatus (not shown). The video display apparatus may comprise, for example, a color television receiver, a computer monitor or other such video display apparatus that includes a cathode ray tube.

A source 1 of alternating voltage potential typically comprises an ac mains voltage. Source 1 thus typically provides a sinusoidal voltage having a value between approximately 90 $V_{RMS}$ and 270 $V_{RMS}$ and a frequency that is equal to approximately 50 Hz or approximately 60 Hz.

Relay 2 is dedicated to automatic degaussing circuit 10; it does not provide power to any other portions of the video display apparatus. Relay 2 is energized when power is applied to the video display apparatus, and it is de-energized at a predetermined time, for example between approximately 1.5 and 2 seconds, after power is applied to the video display apparatus. Relay 2 can be de-energized at any predetermined time after it has been energized and before the video display apparatus becomes fully operational.

Nominal resistance values for thermistors 3 and 4 are chosen with reference to the characteristics of the particular degaussing coil being used, keeping in mind that a cathode ray tube has an Ampere-turns specification limit that should not be exceeded when the relay 2 is de-energized and that, after five cycles of degaussing current, the peak-to-peak value of the degaussing current should be down no more than 50% from the initial peak-to-peak degaussing current. In a presently preferred embodiment, thermistors 3 and 4 each have a nominal resistance of approximately 5Ω and the nominal winding resistance of degaussing coil 5 is equal to approximately 10Ω. Therefore, when relay 2 is energized, source 1 initially sees a dc impedance that is equal to approximately 20Ω and a corresponding degaussing current begins to flow through automatic degaussing circuit 10.

Thermistors 3 and 4 self-heat as the degaussing current flows. As PTC thermistor 3 self-heats, its resistance increases slightly until PTC thermistor 3 reaches its Curie temperature, above which the resistance of PTC thermistor 3 increases dramatically. For example, the resistance of PTC thermistor 3 may increase from a nominal value of approximately 5Ω to a maximum value of approximately 100 kΩ before relay 2 de-energizes. As NTC thermistor 4 self-heats, its resistance decreases exponentially. For example, the resistance of NTC thermistor 4 may decrease from its nominal value of approximately 5Ω to a minimum value of approximately 0.7Ω during the time that relay 2 is energized. Thermistors 3 and 4 are not in thermal contact.

Figure 4A:
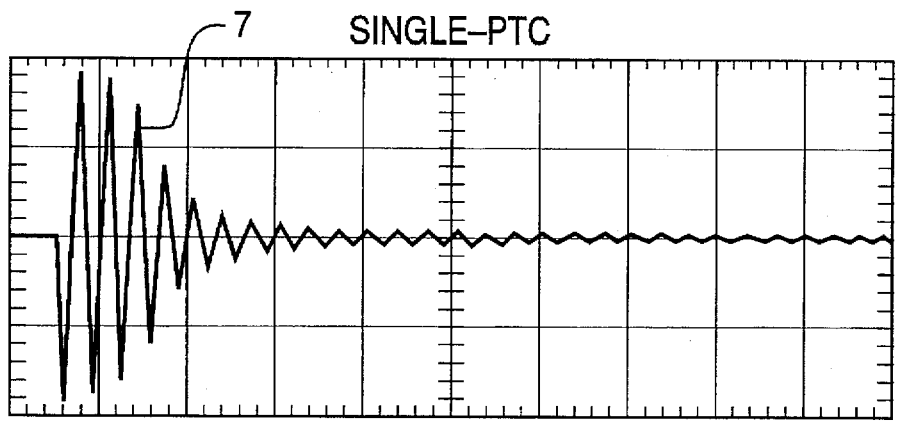
FIGS. 4a–4c show degaussing current waveforms for particular degaussing circuits with a mains voltage of 240 $V_{RMS}$.
Figure 4B:
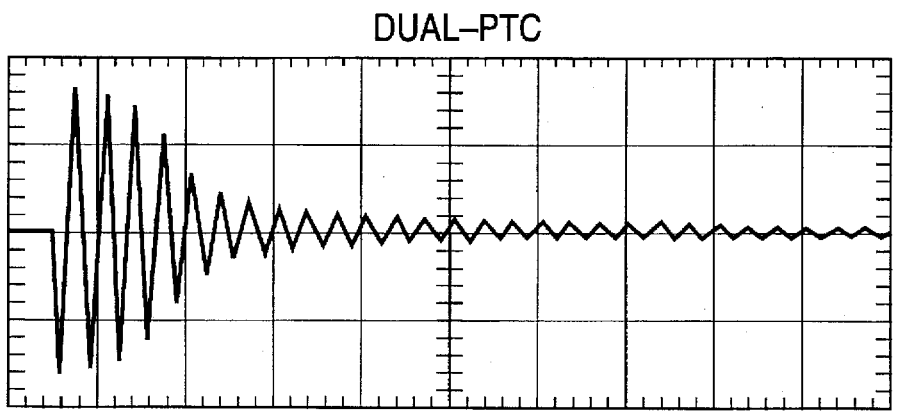
Figure 4C:
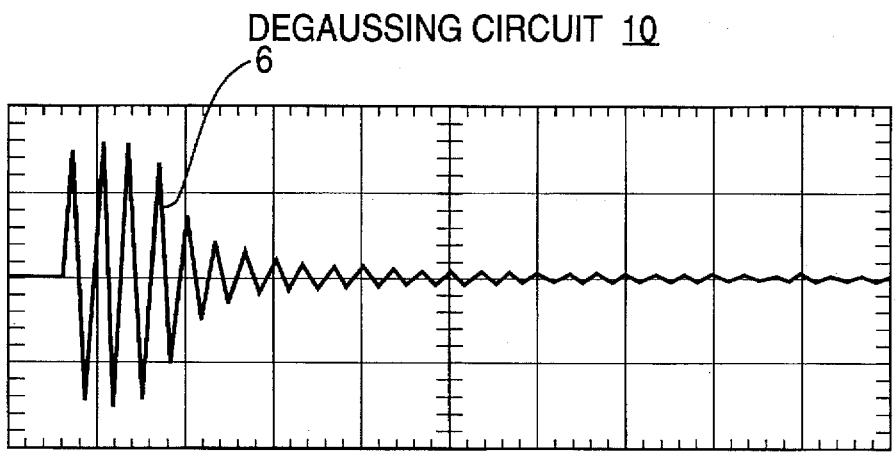

Referring to FIG. 4(c), a degaussing current waveform 6 of automatic degaussing circuit 10, with source 1 providing a voltage of approximately 240 $V_{RMS}$, does not decay too rapidly, thereby avoiding the magnetization problem associated with an overly rapid decay of degaussing current.

Referring now to FIGS. 1 and 4(c), when relay 2 is energized, source 1 initially sees a dc impedance of 20Ω and a degaussing current begins to flow. Thermistors 3 and 4 self-heat and their resistance begins to change accordingly. The resistance of NTC thermistor 4 decreases rapidly, whereas the resistance of PTC thermistor 3 increases only slightly. The net result is that degaussing current begins to increase because the dc impedance of automatic degaussing circuit 10 decreases below 20Ω.

As the degaussing current waveform 6 reaches a maximum peak-to-peak amplitude, NTC thermistor 4 continues to decrease in resistance, but the Curie temperature of PTC thermistor 3 is reached. The resistance of PTC thermistor 3 then increases rapidly, as seen by the monotonically decreasing peak-to-peak amplitudes of the degaussing current waveform 6 that follow its maximum peak-to-peak amplitude.

Figure 2A:
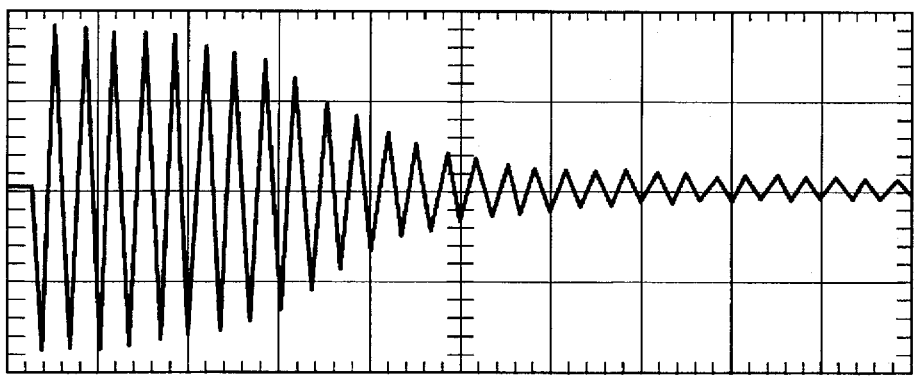
FIGS. 2a–2c show degaussing current waveforms for particular degaussing circuits with a mains voltage of 120 $V_{RMS}$.

A comparison of FIG. 4(c) with FIG. 4(a), which shows a degaussing current waveform 7 for the prior-art, single-PTC thermistor degaussing circuit for a mains voltage of approximately 240 $V_{RMS}$, reveals that automatic degaussing circuit 10 delays the onset of the maximum peak-to-peak amplitude of degaussing current. This delayed onset of the maximum peak-to-peak amplitude of degaussing current is also seen for a mains voltage of approximately 120 $V_{RMS}$ by comparing FIGS. 2(c) and 2(a).

For example, with a mains voltage of approximately 240 $V_{RMS}$, the maximum peak-to-peak amplitude of the degaussing current waveform 6, which is associated with automatic degaussing circuit 10 and is shown in FIG. 4(c), does not occur until the second cycle of the degaussing current waveform 6, whereas the maximum peak-to-peak amplitude of the degaussing current waveform 7, which is associated with the single-PTC thermistor degaussing circuit and is shown in FIG. 4(a), occurs within the first cycle of the degaussing current waveform 7. Thus, automatic degaussing circuit 10 does not generate a significant residual magnetization at a mains voltage of approximately 240 $V_{RMS}$, unlike the prior-art, single-PTC thermistor degaussing circuit, because the degaussing current waveform 6 does not decay too rapidly.

Figure 2B:
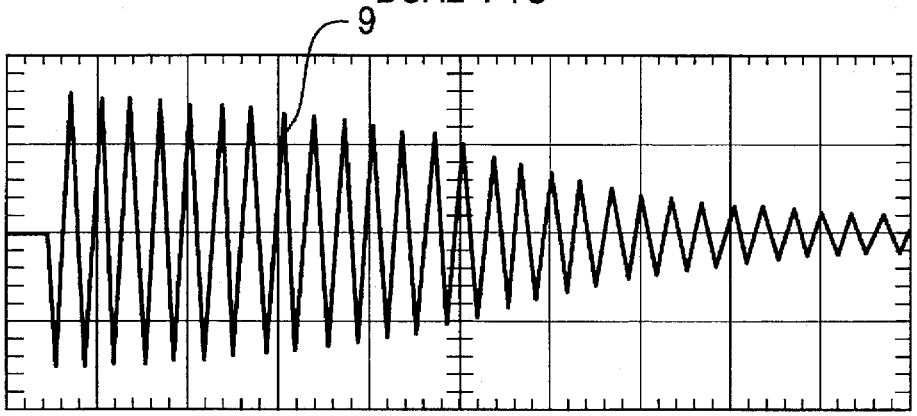
Figure 2C:
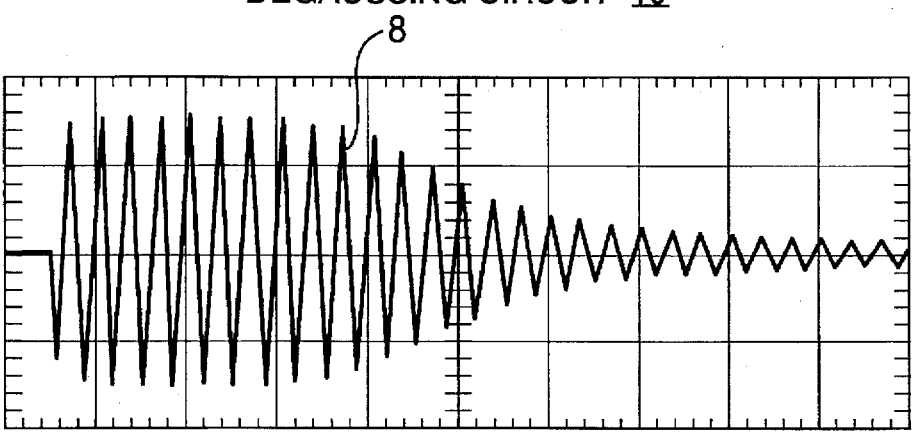
Figure 3A:
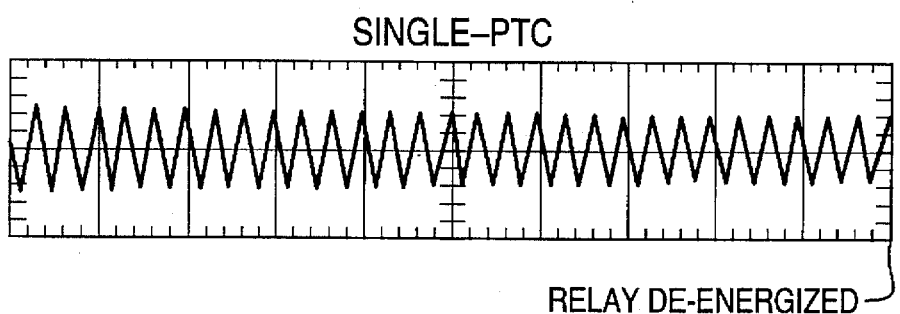
FIGS. 3a–3c show the degaussing current waveforms of FIG. 2 just prior to a degaussing relay becoming de-energized.
Figure 3B:
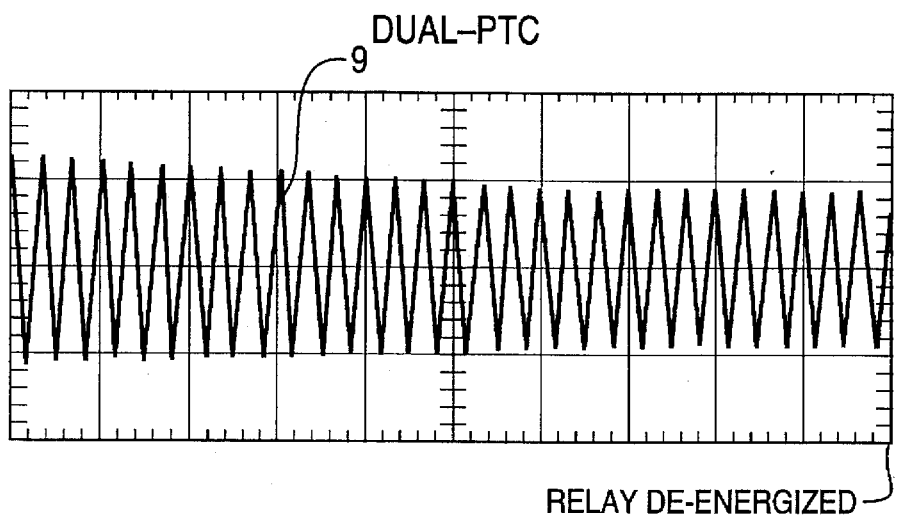
Figure 3C:
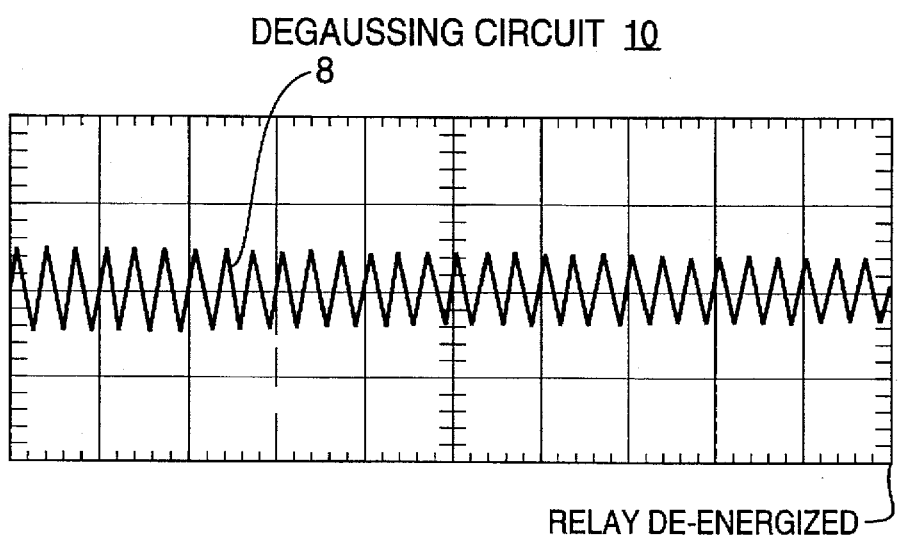

Referring now to FIGS. 2(c) and 3(c), a degaussing current waveform 8 of automatic degaussing circuit 10, with source 1 providing a voltage of approximately 120 $V_{RMS}$, decays to a residual value of approximately 160 mA peak-to-peak just prior to the time that relay 2 is de-energized.

Referring now to FIGS. 1, 2(c) and 3(c), when relay 2 is energized, source 1 again initially sees a dc impedance of 20 Again, as a degaussing current begins to flow, the resistance of PTC thermistor 3 increases only slightly, whereas the resistance of NTC thermistor 4 decreases more rapidly. The net result is that the dc impedance of automatic degaussing circuit 10 decreases below 20Ω and degaussing current increases.

As the degaussing current waveform 8 reaches its maximum peak-to-peak amplitude, NTC thermistor 4 continues to decrease in resistance, but the Curie temperature of PTC thermistor 3 is reached. The resistance of PTC thermistor 3 then increases rapidly, as seen in FIG. 2(c) by the monotonically decreasing peak-to-peak amplitudes of the degaussing current waveform 8 that follow its maximum peak-to-peak amplitude.

A degaussing current waveform 9, which is shown in FIGS. 2(b) and 3(b), is associated with the prior-art, dual-PTC thermistor degaussing circuit for a mains voltage of approximately 120 $V_{RMS}$. A comparison of FIG. 3(c) with FIG. 3(b), which shows a residual peak-to-peak amplitude of degaussing current waveform 9, reveals that, for a mains voltage of approximately 120 $V_{RMS}$, the residual peak-to-peak amplitude of degaussing current is lower in automatic degaussing circuit 10 than it is in the dual-PTC thermistor degaussing circuit. For example, the residual peak-to-peak amplitude of the degaussing current waveform 8, shown in FIG. 3(c), is equal to approximately 160 mA, whereas the residual peak-to-peak amplitude of the degaussing current waveform 9, shown in FIG. 3(b), is equal to approximately 400 mA. Thus, automatic degaussing circuit 10 does not generate a significant residual magnetization at a low mains voltage such as approximately 120 $V_{RMS}$, unlike the prior-art, dual-PTC thermistor degaussing circuit, because the residual peak-to-peak amplitude of the degaussing current waveform 8, when degaussing relay 2 is de-energized, is not too large.

Automatic degaussing circuit 10 has been shown to combine the advantages of both the single-PTC and dual-PTC thermistor degaussing circuits while, at the same time, overcoming the limitations associated with the single PTC thermistor degaussing circuit at high mains voltages and with the dual PTC thermistor degaussing circuit at low mains voltages. As thermistors 3 and 4 self-heat, the resistance of PTC thermistor 3 eventually dwarfs the resistance of NTC thermistor 4, so that automatic degaussing circuit 10 begins to approximate the single-PTC thermistor degaussing circuit in that degaussing circuit 10 begins to look like a single PTC thermistor in series with degaussing coil 5. At the same time, automatic degaussing circuit 10 can accommodate a voltage level of 240 $V_{RMS}$ from source 1 without causing further magnetization problems because degaussing circuit 10 initially looks like the dual-PTC thermistor degaussing circuit in that source 1 sees adc impedance of 20Ω when relay 2 closes.

Having described a preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A degaussing circuit for a cathode ray tube, comprising:

a source of alternating voltage potential;

a switch means coupled to said source;

a first temperature-sensitive device coupled to said switch means;

a second temperature-sensitive device coupled to said first device; and a degaussing coil coupled to said second temperature-sensitive device;

wherein a degaussing current flowing through said first and second temperature-sensitive devices is equal to a degaussing current flowing through said degaussing coil.

2. The degaussing circuit of claim 1, wherein a maximum peak-to-peak value of the degaussing current flowing through said degaussing coil does not occur during a first cycle of said degaussing current.

3. The degaussing circuit of claim 1, wherein said switch means comprises a relay.

4. The degaussing circuit of claim 1, wherein said first and second temperature-sensitive devices comprise resistances.

5. The degaussing circuit of claim 1, wherein said first temperature-sensitive device has a positive temperature coefficient and said second temperature-sensitive device has a negative temperature coefficient.

6. The degaussing circuit of claim 5, wherein:

said first temperature-sensitive device has a first terminal coupled to said switch means and a second terminal; and, said second temperature-sensitive device has a first terminal coupled to said second terminal of said first temperature-sensitive device and a second terminal coupled to said degaussing coil.

7. The degaussing circuit of claim 1, wherein said alternating voltage potential has a root-mean-square value in the range between approximately 90 volts rms and approximately 270 volts rms.

8. The degaussing circuit of claim 1, wherein said alternating voltage potential has a frequency in the range between approximately 50 Hz and approximately 60 Hz.

9. The degaussing circuit of claim 1, wherein said first and second temperature-sensitive devices are not in thermal contact.

10. The degaussing circuit of claim 1, wherein said degaussing circuit does not generate a significant residual magnetization.

* * * * *